UNITED STATES PATENT OFFICE.

PETER BERGELL, OF BERLIN, GERMANY, ASSIGNOR TO THE FIRM OF JOHANN A. WÜLFING, OF BERLIN, GERMANY.

HEXAMETHYLENETETRAMIN-SODIUM ACETATE DOUBLE SALT.

No. 852,993.    Specification of Letters Patent.    Patented May 7, 1907.

Application filed December 18, 1906. Serial No. 348,376. (Specimens.)

*To all whom it may concern:*

Be it known that I, PETER BERGELL, a subject of the Emperor of Germany, and a resident of Berlin, in the Kingdom of Prussia, German Empire, have invented certain new and useful Improvements in Processes for Producing a Hexamethylenetetramin - Sodium Acetate Double Salt, of which the following is a specification.

This invention has reference to the production of a double salt composed of hexamethylenetetramin and acetate of sodium and the process of making same. I have found that these two substances will combine under certain conditions and in certain proportions to form a uniform double salt which contains one molecular proportion of hexmethylenetetramin to two molecular proportions of acetate of sodium and six molecules of water. This new chemical compound is directly formed when the above mentioned molecular proportions of the substances are dissolved and the solution is evaporated. If the proportion of these quantities differs slightly the new compound will crystallize out first and the mother lye will contain the respective surplus of the one component. If the proportion of the quantities differs considerably from the molecular composition, say there is one molecule of the base to one molecule of the salt almost pure hexamethylenetetramin will crystallize out first. This proves that hexamethylenetetramin and acetate of sodium will only combine to form this one double salt containing one molecule of the base to two molecules of the salt and each of the latter retains its three molecules of water of crystallization.

The process of forming the new compound finds expression in the following equation:

$$(CH_2)6N_4 + 2CH_3.COONa.3H_2O = (CH_2)6N_4.2CH_3.COONa.6H_2O.$$

The new compound crystallizes in large pure white crystals which have the form of lancets or needles. When melted the substance sinters slightly together above 62° C and at 118° C it foams up and melts with loss of water of crystallization. This shows plainly that the new double salt differs distinctly from its components, the acetate of sodium with or without water of crystallization as well as the hexamethylenetetramin. The solubility of the new substance in water of ordinary temperature also proves that it is a chemically well defined and uniform compound. 100 parts of the double salt will dissolve in less than 90 parts of water of 15° C. The solubility of acetate of sodium containing water of crystallization is considerably less, 100 parts of the latter will dissolve only in 334 parts of water of 15° C and as the new compound contains almost 662 parts of acetate of sodium containing water of crystallization the solubility in water may serve as a reaction to prove the identity of the new compound. In hot water 3 parts of the new compound will dissolve in less than 2 parts of water. The new substance is also soluble in alcohol but insoluble in ether. Benzene or chloroform dissolve only the organic base of the double salt in the manner as is the case, say, with the known double salts of caffein and this solubility may serve as a practical quantitative analysis for druggists. Alkalies and mineral acids decompose the new double salt.

The new compound shows both chemical and medicinal advantages over hexamethylenetetramin or other compounds of the same. It possesses the property to crystallize to a greater extent, has an agreeable taste and shows by virtue of the combination with acetate of sodium a much greater diuretic effect.

The new compound may be made to still greater advantage when directly produced from formaldehyde, ammonia, and acetate of sodium of the respective molecular proportions with a small surplus of ammonia in a more economical manner and of the same purity as if hexamethylenetetramin is first synthetically prepared from formaldehyde and ammonia and then combined with acetate of sodium.

The invention may be carried into practice in substantially the following manner: 14 kilograms of hexamethylenetetramin are dissolved in water with 27.2 kilograms of acetate of sodium containing water of crystallization and then evaporated in a vacuum until crystallization sets in. On cooling the mass forms a stiff paste of crystals which is seprated from the mother lye in the usual manner. 0.2000 grams of the substance dried in the exsiccator above sulfuric acid until the weight becomes constant will yield, according to Kjeldahl, 26.04 milligrams of nitrogen, equal to 13.02%. 0.5000 grams of the substance treated in the same manner will yield, if evaporated with sulfuric acid, 0.1661 grams of sulfate of sodium, equal to 10.76% Na.

Having thus described my invention I claim as new and desire to secure by Letters Patent:

1. The process of producing a new medicinal compound, a double salt of hexamethylenetetramin and acetate of sodium consisting in dissolving in water one molecular proportion of hexamethylenetetramin and two molecular proportions of acetate of sodium and evaporating same.

2. The process of producing a new medicinal compound, a double salt composed of hexamethylenetetramin and acetate of sodium consisting in dissolving in water one molecular proportion of hexamethylenetetramin and two molecular proportions of acetate of sodium and evaporating this solution in a vacuum.

3. As a novel composition of matter a crystalline medicinal compound composed of one molecular proportion of hexamethylenetetramin and two molecular proportions of acetate of sodium melting at 118° C. with loss of water of crystallization, soluble in less than its own weight of water of ordinary temperature and in alcohol, insoluble in ether while benzene and chloroform dissolve only the hexamethylenetetramin.

In witness whereof I have hereunto signed my name this 3rd day of December 1906, in the presence of two subscribing witnesses.

PETER BERGELL.

Witnesses:
 HENRY HASPER,
 WOLDEMAR HAUPT.